No. 721,247. PATENTED FEB. 24, 1903.
A. G. SMART.
FORK AND SPOON.
APPLICATION FILED JULY 28, 1902.

NO MODEL.

WITNESSES
Eli Hughes
Arthur Clark

INVENTOR
Albert G. Smart.
by Herbert W. J. Jenner.
Attorney

THE NORRIS PETERS CO., PHOTO-LITHO., WASHINGTON, D. C.

UNITED STATES PATENT OFFICE.

ALBERT G. SMART, OF MELROSE HIGHLANDS, MASSACHUSETTS.

FORK AND SPOON.

SPECIFICATION forming part of Letters Patent No. 721,247, dated February 24, 1903.

Application filed July 28, 1902. Serial No. 117,316. (No model.)

*To all whom it may concern:*

Be it known that I, ALBERT G. SMART, a citizen of the United States, residing at Melrose Highlands, in the county of Middlesex and State of Massachusetts, have invented certain new and useful Improvements in Forks and Spoons; and I do hereby declare the following to be a full, clear, and exact description of the invention, such as will enable others skilled in the art to which it appertains to make and use the same.

This invention relates to forks and spoons; and it consists of the novel construction and combination of the parts hereinafter fully described and claimed.

Figure 1:
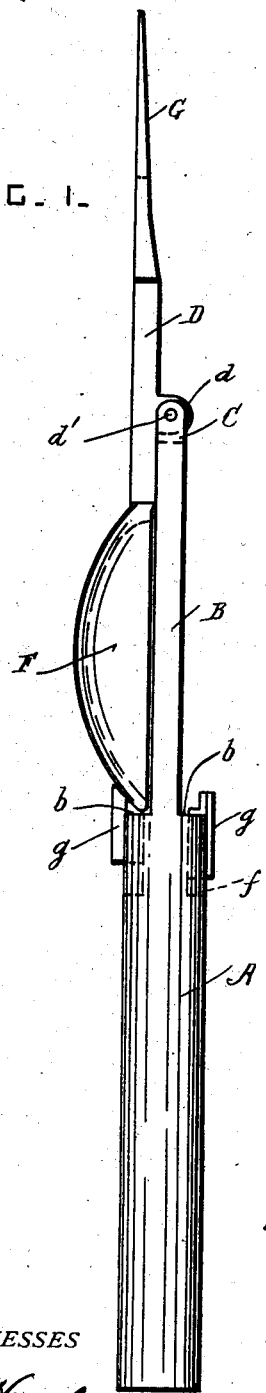
Figure 2:
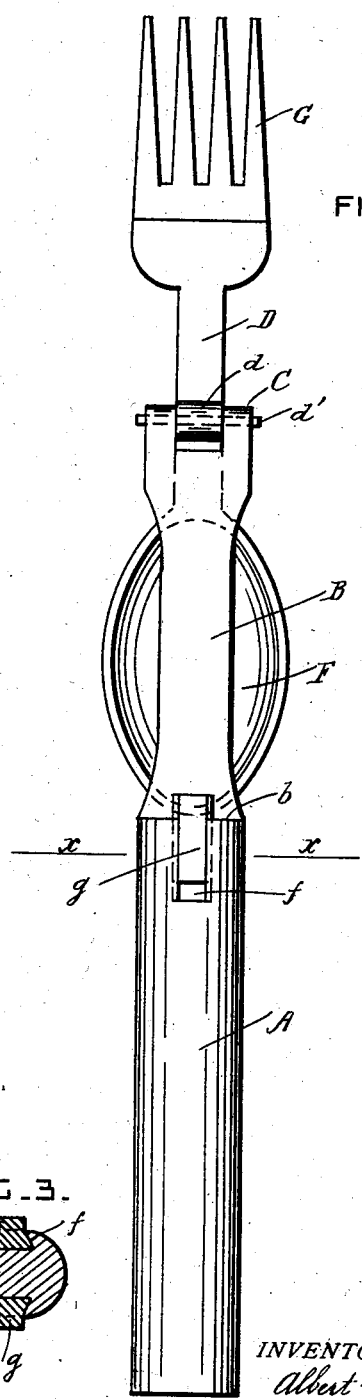
Figure 3:
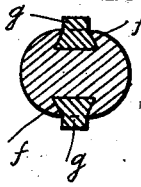

In the drawings, Figure 1 is a side view of the fork and spoon. Fig. 2 is a plan view of the same. Fig. 3 is a cross-section through the handle, taken on the line $x$ $x$ in Fig. 2.

A is the handle, provided with a flat bar B at its front end and having shoulders $b$ where it joins onto the said bar. The bar B has a double eye C at its free end, and D is a bar provided with a lug $d$ at its middle portion, which is pivoted to the double eye C by a pin $d'$. The bar D has a spoon F at one end and a fork G at the other end. Each shoulder $b$ is provided with a dovetailed socket $f$, and $g$ is a catch which is slidable longitudinally in the said socket. These catches engage with the fork and the spoon, respectively, according to the position of the bar D, and they hold the bar D in position.

The spoon and the fork are used alternately, as required, and the article is a very useful one for use in kitchens and on picnics.

What I claim is—

1. The combination, with a handle, of a bar having its middle portion pivoted to one end of the handle and having a spoon at one end and a fork at the other, and catches for coupling the said spoon and fork to the handle alternately, substantially as set forth.

2. The combination, with a handle having a flat bar at its free end and shoulders provided with dovetailed sockets where it joins onto the said bar, of a bar provided with a fork at one end and a spoon at the other end and having its middle portion pivoted to the free end of the said bar, and catches slidable longitudinally in the said sockets and coupling the spoon and the fork to the said handle alternately, substantially as set forth.

In testimony whereof I affix my signature in presence of two witnesses.

ALBERT G. SMART.

Witnesses:
 ALICE J. MURRAY,
 FRED. K. DAGGETT.